Feb. 19, 1957 J. L. GRATZMULLER 2,781,776
PRESSURE REGULATING VALVES
Filed April 8, 1952 5 Sheets-Sheet 1

Inventor
J. L. Gratzmuller
By Glascock Downing Seebold
Attys.

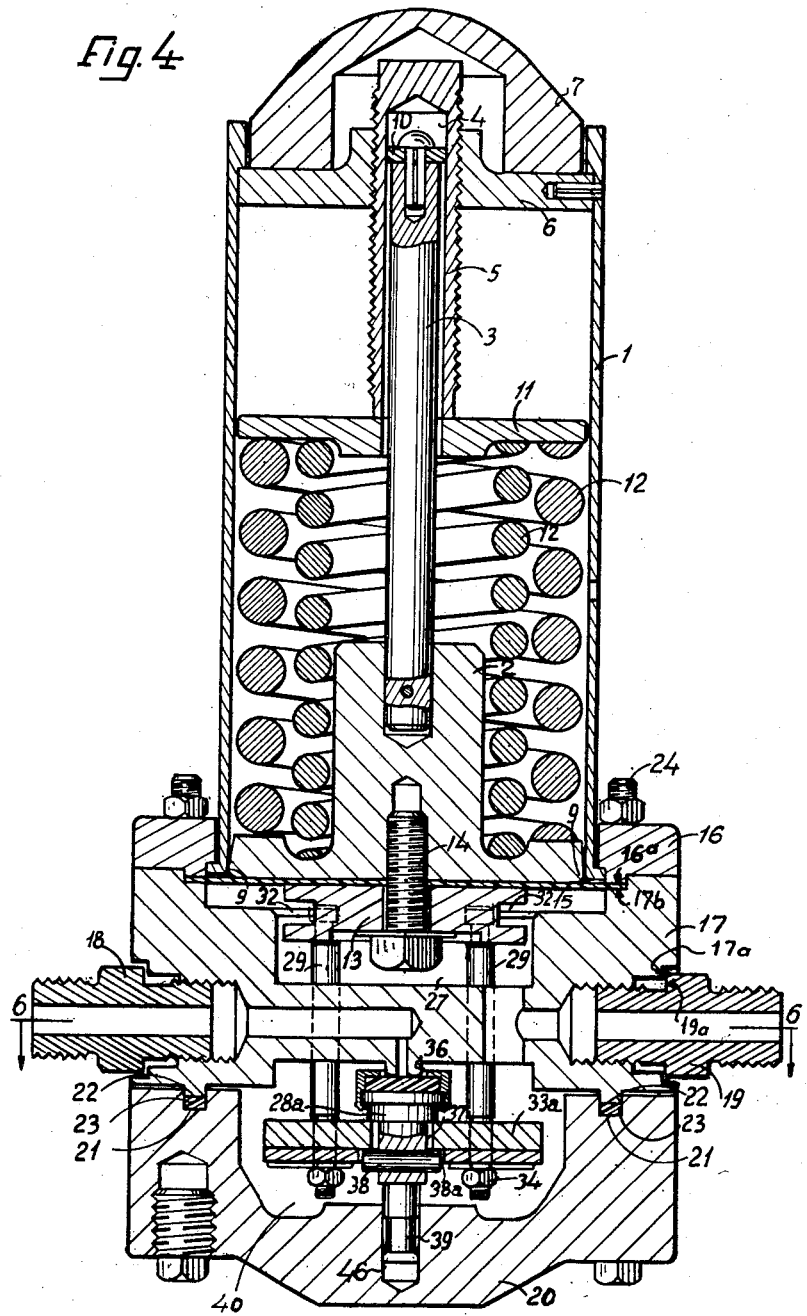

Feb. 19, 1957 J. L. GRATZMULLER 2,781,776
PRESSURE REGULATING VALVES
Filed April 8, 1952 5 Sheets-Sheet 5

Inventor
J. L. Gratzmuller
By Haseltine Lake Seebold
Attys.

United States Patent Office 2,781,776
Patented Feb. 19, 1957

2,781,776

PRESSURE REGULATING VALVES

Jean Louis Gratzmuller, Paris, France

Application April 8, 1952, Serial No. 281,115

Claims priority, application France April 10, 1951

8 Claims. (Cl. 137—505.44)

The present invention relates to pressure regulating valves such as pressure reducing valves and safety valves, of the kind in which a valve member, co-operating with a fixed seating, is operatively connected to a flexible diaphragm subjected on the side on which a valve member is situated to the pressure to be regulated, and on the other to the effort of elastic means such as a spring, which can be adjusted so that the diaphragm is in equilibrium under the opposed forces when the pressure to be regulated reaches a predetermined critical value.

Previously known valves have used diaphragms of relatively stiff strong material. In such previously known valves the operation of the valve has been indeterminate since the necessary stiffness of the diaphragm material substantially modifies the operation of such a valve and, due to the necessary characteristics of such a diaphragm, the diaphragms are subjected to conditions that cause early mechanical failure of such diaphragm. Furthermore just prior to such failure the weakness of the diaphragm will cause the valve to operate in a manner other than as designed.

According to the present invention, the diaphragm is completely supported by a piston element or by the housing in which the piston operates thus the diaphragm needs flexibility rather than tensile strength. The use of such a piston supported diaphragm further has the advantage that even if the diaphragm should leak the valve would operate, although not perfectly, to prevent overpressuring the equipment to which the pressure is supplied.

One object of the present invention is to provide a movable assembly secured to the diaphragm and operatively connected to the valve member which is axially guided at two positions axially spaced widely apart, both such positions being on the side of the diaphragm subjected to the effort of the elastic means.

A further object of the present invention is to provide the valve body and other stationary parts of the valve with mutually registering parts enabling them to be assembled by simply fitting together, which parts are secured together after assembly by simple tie bolts. Preferably also the elastic means is enclosed in a casing, the members of which have mutually registering parts and are held together after assembly by the effort exerted by the elastic means itself.

In the case of a pressure reducing valve the valve member may be mounted on a valve supporting member connected to the movable assembly, between which and the supporting member the valve member is situated.

In a preferred form of construction a pressure reducing valve according to the invention the valve supporting member (above referred to) is connected to a movable assembly by rods parallel to and spaced around the axis of the valve member, and these rods have longitudinal play on each end with respect to the valve supporting member and to the movable assembly respectively and have lateral clearances in guide bores formed in the valve body; and this end play and these clearances are such as to ensure adequate axial guidance of the valve supporting member while eliminating the possibility of nipping or binding of the valve member and/or its supporting member.

In this construction the ends of the rods connected to the movable assembly may have heads entering, with end play, into an annular groove form in circumference, and that part of the movable member lying at the opposite side of the diaphragm to the elastic means, and the lateral clearances of the rods, being sufficient to allow their heads to escape from the annular groove.

The accompanying drawings illustrate by way of example three specific embodiments of the invention.

In the drawings:

Figure 4 is a view similar to Figure 1 of a pressure reducing valve suitable for high outlet pressures, the section being taken on the line 4—4 of Figure 6;

In the drawings like parts are designated by like reference characters.

Figure 1:
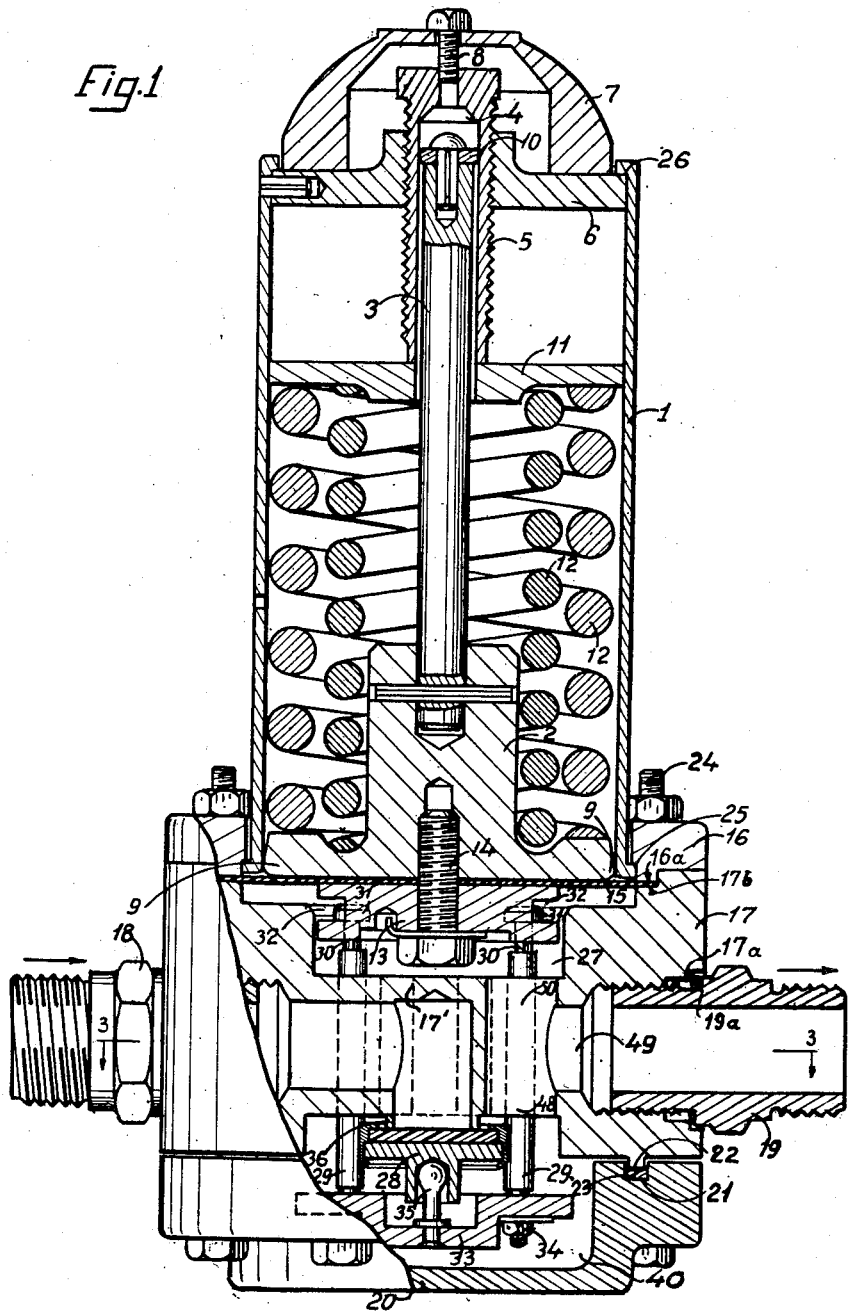
Figure 1 is an axial section taken along the line 1—1 of Figure 3 of a pressure reducing valve suitable for maintaining a low regulating outlet pressure.
Figure 2:
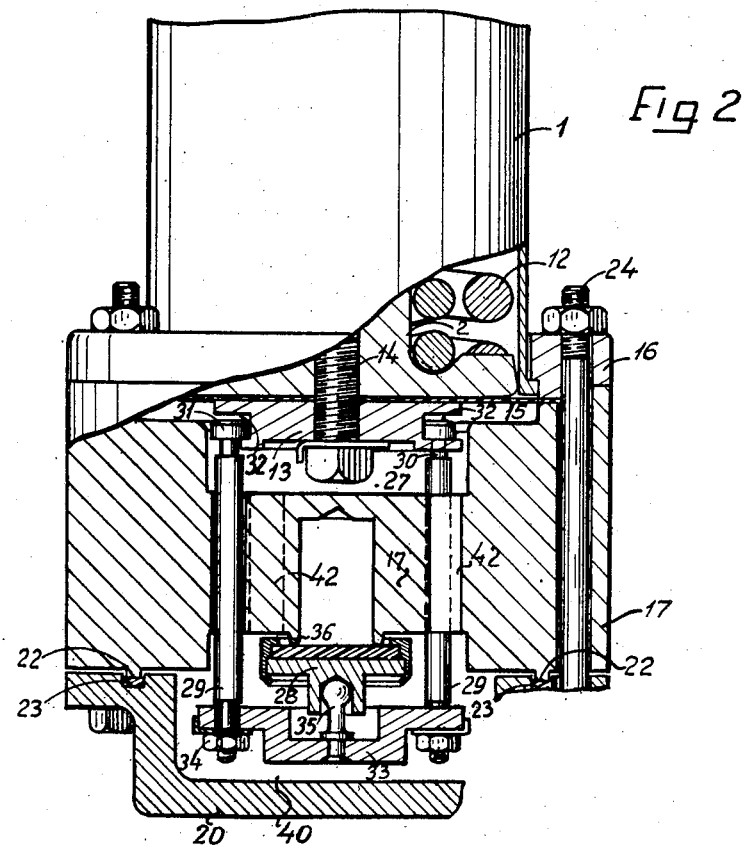
Figure 2 is a partial axial section taken on the line 2—2 of Figure 3.
Figure 3:
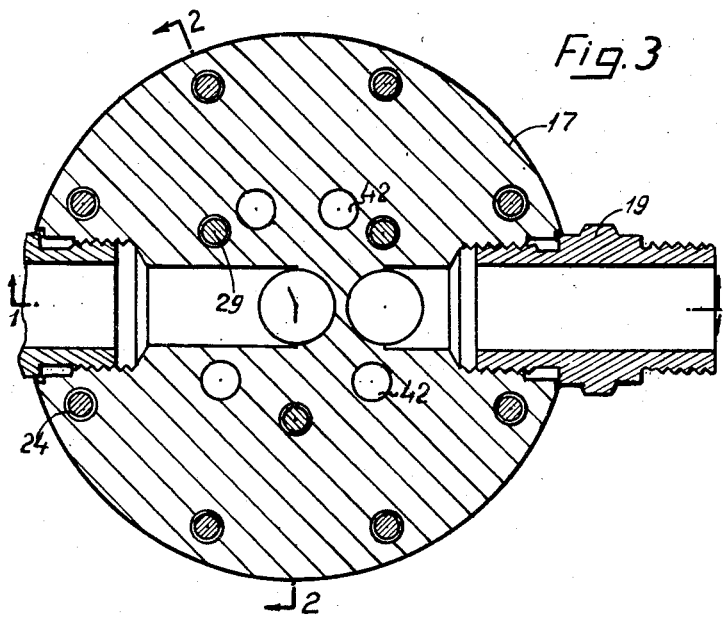
Figure 3 is a plan section taken on the line 3—3 of Figure 1.

Referring to Figures 1 to 3, the valve comprises a cylinder 1 in which is slidable a mushroom head 2 to which is pinned an axially extending rod 3. The latter enters an axial boring 4 formed in an adjusting screw 5 which is in threaded engagement with a cylinder head 6. A cap 7 is secured to the head 6 by a threaded stud 8 entering a capped hole in the head of the adjusting screw 5.

The outer rim of the mushroom head 2 is rounded so as to make line contact only with the wall of cylinder 1, and the end of the rod 3 carries a washer 10, the periphery of which is of rounded section so as to make a line contact only with the wall of the boring 4 in the adjusting screw 5.

The rim of the circumference 9 of the mushroom head 2 and the washer 10 thus constitute the sole means by which the movable assembly hereinafter referred to, of which the mushroom head 2 constitutes a part, is centred and guided; and it will be noticed that these guiding elements 9 and 10 are axially spaced widely apart.

Between the mushroom head 9 and a loose abutment plate 11, which abuts on the lower end of the adjusting screw 5, are trapped concentric helical springs 12 constituting the elastic means by which a flexible diaphragm 15 is loaded. The effort exerted by the springs 12 can be adjusted by screwing the adjusting screw 5 in or out, as the case may be, for which purpose the cap 7 must first be removed by unscrewing the stud 8. The diaphragm 15 is in contact with the flat faces of the mushroom head 2 over the whole area of the latter, and the central part of the diaphragm is clamped to the mushroom head by a member 13 secured by a threaded stud 14 which enters an axially tapped hole in the mushroom head 2. The movable assembly above referred to is constituted by the mushroom head 2, member 13 and stud 14.

The margin of the diaphragm 15 is clamped between the flat faces of an annular rebate 17b formed in the valve body 17 and a registering annular shoulder 16a formed on the clamping ring 16.

The valve body 17 is provided with diametrically opposed lateral, internally threaded openings which receive inlet and outlet unions 18, 19 respectively.

A shoulder 19a on the union 19 makes contact over a very small area with a corresponding shoulder 17a formed in the valve body 17 when the union is fully screwed home. This contact area is smaller than the contact area of the threads of the union and of the tapped opening into which it is screwed so that when the union is screwed home bearing stress at the contact area 17a, 19a exceeds that on the threads. The union is made of metal of a different hardness to that of the valve body so that when the union is screwed home the softer metal becomes slightly crushed over the contact area 17a, 19a, thus ensuring a good seal without setting up excessive resistance to the turning of union 19. The union 18 is constructed in a similar manner. The lower end of the valve body 17 is closed by the cover plate 20 in which is formed an annular groove 21 entered by a registering annular rib 22 formed at the base of the valve body. Groove 21 contains an annular sealing gasket 23.

It will be seen that the shoulder 16a and rebate 17b, and also the groove 21 and shoulder 22 constitute mutually registering parts enabling the valve body 17, clamping ring 16 and base cover 20 to be assembled by simply fitting them together, and the whole is secured as assembled by means of tie bolts 24 which pass through holes bored in the valve body, clamping ring and base cover.

The clamping ring has on its inner face a shallow shoulder 25 which engages an outward flange on the lower end of the cylinder 1; and the upper end of the cylinder 1 has an inward flange 26 which engages over the margin of the cylinder head 6. The effort exerted by the springs 12 transmitted through the abutment plate 11, the adjusting screw 5 and the cylinder head 6 to the inward flange 26 of the cylinder 1 is further transmitted in tension by the cylinder 1 to the outward flange on its lower end and holds this latter firmly in engagement with shoulder 25 of the clamping ring 16.

In this case the casing of the elastic means 12 consisting of cylinder head 1 and cylinder head 6 is held in position by the effort of the elastic means 12 itself.

The middle part 17' of the valve body 17 is continuous and constitutes a partition separating an upper cavity 27 enclosed by the diaphragm 15 from a lower cavity 40 enclosed by the base cover 20.

The diametrically opposed lateral openings receiving the inlet and outlet unions extend into the partition portion of the valve body, and that receiving to the inlet union 18 communicates via an axial boring with an opening on the lower face of the partition portion, around which is a rim 36 forming the valve seat. The opening receiving the outlet union 19 communicates with a boring 48, 50 extending right through the partition portion of the valve body, which is also pierced by openings 42 establishing further communication between the cavities 27 and 40.

In the cavity 40 is housed a valve-supporting member 33 carrying a central upstanding stem terminating in a ball 35, which enters a socket in and thereby supports the valve member 28 adapted to seat on the valve seat 36.

The valve supporting member 33 is connected to the member 13 of the movable assembly by three rods 29 secured to the valve-supporting member 33 by nuts 34 with some end play. The rods 29 are parallel to the axis of the valve and spaced symmetrically about it and can slide in guideways formed in the partition portion 17' of the valve body which is in effect a fixed cross member, with some lateral clearance and their upper ends have necked portions 30 and enlarged heads 31 engaging with end play in an annular groove 32 formed in the circumference of member 13, the lower lip of this groove being cut away to admit the necks 30 with clearance.

The side clearances of the rods 29 in their guides are insufficient to allow the heads 31 to escape from groove 32, when the whole is assembled.

The effect of the end plays and side clearances of the rods 29 and of the ball and socket mounting of the valve member 28 is to allow for slight misalignment of the valve member and slight rocking displacement thereof thus enabling it to seat properly in all conditions and to eliminate all possibility of nipping or binding of the valve member or the rods 29, while adequately maintaining the general alignment and axial guidance of the valve-supporting member 33.

Chamber 40 communicates through the openings 42 and 48, 50 with the chamber 27 and with the outlet opening 49 through the opening 48, 50 the combined cross-section of whose two branches, 48 and 50 respectively, is at least as great as that of the opening 49 so that there is no appreciable loss of pressure between chamber 27 and outlet 49. The pressure experienced by the underside of diaphragm 15 is therefore substantially that in the outlet 49.

Figure 6:
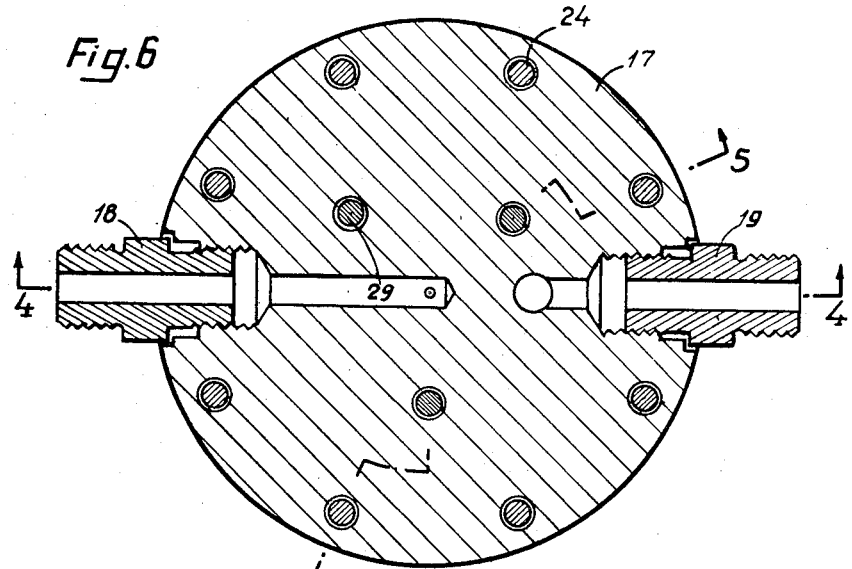
Figure 6 is a view of the same similar to Figure 3, the section being taken on the line 6—6 of Figure 4.
Figure 5:
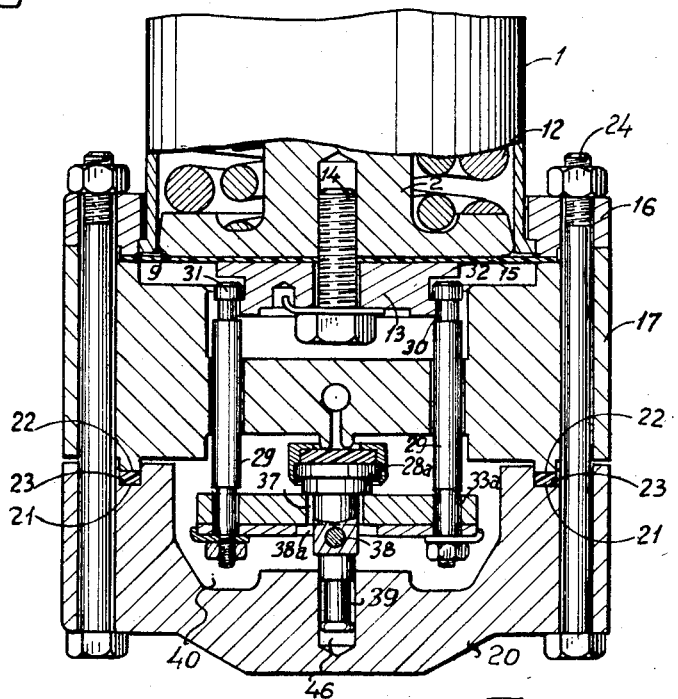
Figure 5 is a view of the same similar to Figure 2, the section being taken on the line 5—5 of Figure 6.

The pressure reducing valve illustrated in Figures 4 to 6 is suitable for high outlet pressures and differs from that of Figures 1 to 3 in that the area of the opening surrounded by the valve seat 36 is relatively small. The valve 28a itself is also small and is directly supported by the valve-supporting member 33a, which has an axial boring 37, into which the stem 39 of the valve member fits with generous clearance, being retained by a cotter 38, which fits with end clearance all round, into an annular rebate 38a formed in the valve-supporting member 33a. The valve stem 39 is extended downwards to enter slidingly into a blind axial boring 46 in the base cover 20. The stem 39 is necked and has lateral clearance in the boring 46 except that the extremity of the stem, having rounded contours to give line contact, is a sliding fit in boring 46. This, together with the clearances of the cotter 38a and of the stem 39 in boring 37 and those of the rods 29, affords latitude for slight misalignments of the valve member and slight rocking displacement thereof sufficient to ensure proper seating and eliminate nipping or binding.

In other respects the construction of the valve illustrated in Figures 4 to 6 follows that illustrated in Figures 1 to 3.

What is claimed is:

1. A pressure regulating valve comprising a valve casing forming a pressure chamber having inflow and outflow passages and provided with an annular clamping end surface, a stationary valve seat disposed between said passages, a housing, means for securing the housing to the valve casing including an assembling member having a clamping surface in opposition to the clamping surface of the valve casing, said housing forming a cylindrical spring chamber axially aligned with said pressure chamber, a flat faced spring pressed piston slidably mounted in said spring chamber to have its working face subject to the fluid pressure in said pressure chamber, the periphery of said piston being of rounded section so as to make line contact with the wall of said spring chamber, a rod carried by said piston, means for guiding said rod within said spring chamber, a normally flat and unstretched sealing element of readily yieldable resilient material having its periphery clamped and compressed between the said clamping surfaces of the valve casing and the assembling member whereby one side of the uncompressed portion of the sealing element lies across said working surface of the piston, a movable valve member in said valve casing cooperating with said seat, a supporting member operably connected with said valve member disposed on the side of said uncompressed portion of the sealing element opposite the piston, and means traversing said sealing element for connecting said valve supporting member to said working face of the piston.

2. A pressure regulating valve according to claim 1, in which said guiding means for said piston rod comprises a tubular member mounted in the end wall of said housing, said rod extending within said tubular member with a clearance space therebetween and carrying a washer of rounded section so as to make a line contact with the inner wall of said tubular member.

3. The pressure regulating valve of claim 1 in which said stationary valve seat is so located that the said valve member is biased toward the open position by said spring.

4. The pressure regulating valve of claim 1 in which the valve supporting member is connected to the movable assembly by rods parallel to and spaced around the axis of the valve member.

5. A pressure regulating valve comprising a valve casing forming a pressure chamber having inflow and outflow passages and provided with an annular clamping end surface, a stationary valve seat disposed between said passages, a housing, means for securing the housing to the valve casing including an assembling member having a clamping surface in opposition to the clamping surface of the valve casing, said housing forming a cylindrical spring chamber axially aligned with said pressure chamber, a flat faced spring pressed piston slidably mounted in said spring chamber to have its working face subject to the fluid pressure in said pressure chamber, the periphery of said piston being of rounded section so as to make line contact with the wall of said spring chamber, a rod carried by said piston, means for guiding said rod within said spring chamber, a normally flat and unstretched sealing element of readily yieldable resilient material having its periphery clamped and compressed between the said clamping surfaces of the valve casing and the assembling member whereby one side of the uncompressed portion of the sealing element lies across said working surface of the piston, a movable valve member in said valve casing cooperating with said seat, a valve supporting member disposed on the side of said uncompressed portion of the sealing element opposite the piston, means traversing said sealing element for connecting said valve supporting member to said working face of the piston, a plate member disposed in said pressure chamber, said plate member carrying the movable valve member, at least three rods parallel to and spaced around the axis of said movable valve member and connecting the plate member to said supporting member, said rods having longitudinal play at each end with respect to said supporting member and to said plate member respectively, a fixed cross member in the casing having guideways therethrough, said rods being disposed in said guideways with lateral clearances relative thereto, said end play and clearances being such as to insure adequate axial guidance of said plate member while eliminating the possibility of nipping or binding said movable valve member and said rods.

6. A pressure regulating valve according to claim 5, wherein heads are provided on the ends of said rods and wherein the periphery of said supporting member is provided with an annular groove into which the heads enter with end play, the lateral clearances of the rods being insufficient to allow the heads to escape from said annular groove.

7. A pressure regulating valve according to claim 5, in which a ball and socket joint is provided for mounting the movable valve member on the plate member.

8. A pressure regulating valve according to claim 5, in which said valve closing member is mounted on a stem axially guided in a recess provided in the wall of said casing opposite to said piston, and said stem extending through said plate member to which said stem is connected by means of a swivel joint.

References Cited in the file of this patent
UNITED STATES PATENTS

| Number | Name | Date |
|---|---|---|
| 502,434 | Gibson | Aug. 1, 1893 |
| 559,221 | Schneibel | Apr. 28, 1896 |
| 959,458 | Carroll | May 31, 1910 |
| 1,513,740 | Brown | Nov. 4, 1924 |
| 1,525,426 | Mueller | Feb. 3, 1925 |
| 1,676,031 | Holley | July 3, 1928 |
| 1,697,865 | Hahn | Jan. 8, 1929 |
| 1,897,061 | Lapp | Feb. 14, 1933 |
| 1,905,042 | Moore | Apr. 25, 1933 |
| 1,917,698 | Carson | July 11, 1933 |
| 2,093,671 | Griffen | Sept. 21, 1937 |
| 2,126,452 | Creveling | Aug. 9, 1938 |
| 2,180,828 | Horansky | Nov. 21, 1939 |
| 2,190,464 | Wile | Feb. 13, 1940 |
| 2,215,930 | Mahla | Sept. 24, 1940 |
| 2,259,809 | Freeman | Oct. 21, 1941 |
| 2,338,760 | Deming | Jan. 11, 1944 |
| 2,486,060 | Petersen | Oct. 25, 1949 |
| 2,576,443 | Brandstrom | Nov. 27, 1951 |
| 2,599,956 | Wallace | June 10, 1952 |
| 2,614,367 | Grosball | Oct. 21, 1952 |
| 2,614,573 | Jacobson | Oct. 21, 1952 |
| 2,637,945 | Parks | May 12, 1953 |

FOREIGN PATENTS

| 24,349 | Great Britain | of 1901 |
| 379,875 | France | of 1907 |